(12) United States Patent
Smith

(10) Patent No.: US 6,230,781 B1
(45) Date of Patent: *May 15, 2001

(54) CRIMPER ASSEMBLY FOR SEALING OVERLAPPING PORTIONS OF A SHEET OF PACKAGING MATERIAL

(75) Inventor: Larry E. Smith, Perrysburg, OH (US)

(73) Assignee: Lako Tool & Manufacturing, Inc., Perrysburg, OH (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 08/922,493

(22) Filed: Sep. 3, 1997

Related U.S. Application Data

(63) Continuation-in-part of application No. 08/712,106, filed on Sep. 13, 1996, now Pat. No. 5,868,901.

(51) Int. Cl.$^7$ .............................. B65B 51/09; B65B 51/10
(52) U.S. Cl. ........................ 156/582; 156/581; 53/374.4; 53/376.2
(58) Field of Search ..................... 156/581, 582, 156/515; 53/374.4; 264/271.1; 428/71, 313.5, 465, 466

(56) References Cited

U.S. PATENT DOCUMENTS

| | | | |
|---|---|---|---|
| 918,060 | * 4/1909 | Kabureck | ................................... 4/428 |
| 1,250,959 | * 12/1917 | Brown | ................................ 264/271.1 |
| 2,239,133 | 4/1941 | Waters . | |
| 2,442,936 | 6/1948 | Rohdin . | |
| 2,556,382 | * 6/1951 | Williams et al. | ..................... 414/736 |

(List continued on next page.)

FOREIGN PATENT DOCUMENTS 2254286    10/1992 (GB) .

Primary Examiner—Michael W. Ball
Assistant Examiner—Barbara J. Musser
(74) Attorney, Agent, or Firm—MacMillian, Sobanski & Todd, LLC

(57) ABSTRACT

A crimper assembly includes upper and lower crimper bars which are rotated relative to a sheet of packaging material. A pair of upper crimpers are secured to opposite sides of the upper crimper bar, while a pair of lower crimpers are secured to opposite sides of the lower crimper bars. Each of the upper crimpers includes a metallic base having an outwardly facing portion with an undulating cross sectional shape. A slot is formed in the outwardly facing portion of the upper crimper, and a cutting blade is retained therein. In a first embodiment, an insert is secured to the base of each of the upper crimpers. The insert includes a rigid shank having a lip portion extending therefrom. Portions of the outer surface of the shank are covered by a layer of a relatively resilient material. The layer is formed from a material which is suitable for compressing overlapping portions of the folded sheet of packaging material to form an intermeshing seal pattern. The outwardly facing portion of the layer of resilient material includes a longitudinally extending, outwardly facing resilient crimping surface with an undulating cross sectional shape. The lower crimpers are formed in a similar manner, except that an anvil is retained within the slot. During operation, the crimpers are rotated such that the folded sheet of packaging material is compressed between the downwardly facing undulating surface of the upper resilient layer and the upwardly facing undulating surface of the lower base. As a result, the overlapping layers which make up the folded sheet of packaging material are sealed together to form a trailing edge seal for a packaged article.

17 Claims, 7 Drawing Sheets

U.S. PATENT DOCUMENTS

| | | |
|---|---|---|
| 2,589,756 * | 3/1952 | Waters .................................. 156/581 |
| 2,601,294 * | 6/1952 | Jahn et al. ............................... 81/19 |
| 2,607,696 | 8/1952 | Kunz . |
| 2,627,893 * | 2/1953 | Williams ............................ 53/374.4 |
| 2,724,424 | 11/1955 | Clayton et al. . |
| 3,153,607 | 10/1964 | Ambler . |
| 3,243,487 | 3/1966 | Smith . |
| 3,258,385 | 6/1966 | Lake . |
| 3,468,731 | 9/1969 | Obeda . |
| 3,847,711 | 11/1974 | Howard . |
| 3,943,686 | 3/1976 | Crawford et al. . |
| 3,986,914 | 10/1976 | Howard . |
| 4,135,957 | 1/1979 | Voller . |
| 4,254,601 | 3/1981 | Prager et al. . |
| 4,288,967 | 9/1981 | Seko et al. . |
| 4,288,968 | 9/1981 | Seko et al. . |
| 4,403,465 | 9/1983 | Bachner . |
| 4,452,660 | 6/1984 | Davies et al. . |
| 4,455,808 | 6/1984 | Netzhammer . |
| 4,545,174 | 10/1985 | Seko . |
| 4,576,588 | 3/1986 | Umeda et al. . |
| 4,582,555 | 4/1986 | Bower . |
| 4,617,782 | 10/1986 | Mattei et al. . |
| 4,693,058 | 9/1987 | Kovacs . |
| 4,737,231 | 4/1988 | Seko et al. . |
| 4,807,426 | 2/1989 | Smith . |
| 5,015,223 * | 5/1991 | Boeckmann ......................... 156/581 |
| 5,485,770 * | 1/1996 | Popelak ................................. 81/423 |

* cited by examiner

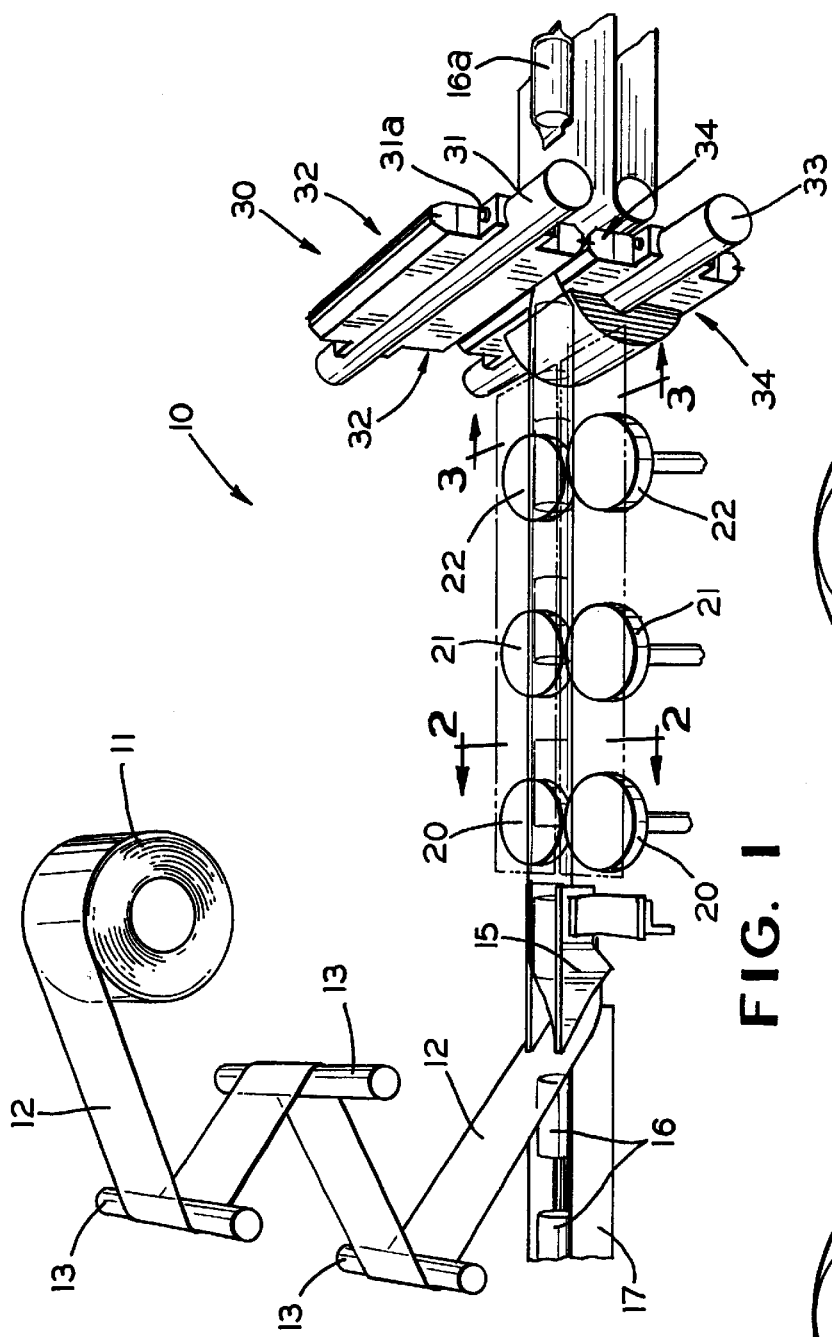
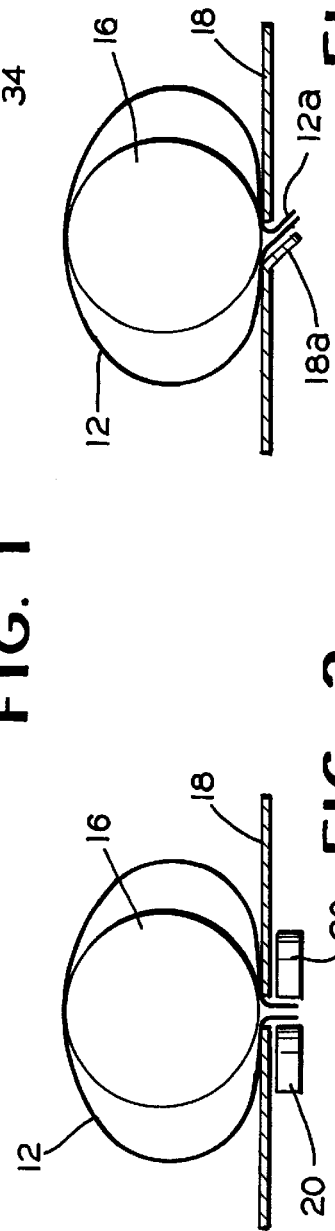
FIG. 1
FIG. 2
FIG. 3

CRIMPER ASSEMBLY FOR SEALING OVERLAPPING PORTIONS OF A SHEET OF PACKAGING MATERIAL

CROSS-REFERENCE TO RELATED APPLICATION

This application is a continuation-in-part of U.S. application Ser. No. 08/712,106, filed Sep. 13, 1996, now U.S. Pat. No. 5,868,901.

BACKGROUND OF THE INVENTION

This invention relates in general to form, fill, and seal packaging machinery of the type in which a continuous sheet of a packaging material is sequentially folded about a series of articles to be packaged, hot or cold sealed about the articles, and cut into individually sealed packages. More specifically, this invention pertains to an improved crimper assembly for forming end seals in overlapping portions of the sheet of packaging material after being folded about an article.

The formation of a plurality of individually sealed packages of articles using a single continuous sheet of a packaging material is well known in the art. Briefly, the sheet of packaging material is initially passed through a folding mechanism, which continuously folds the film over on itself to form an enclosure for a series of spaces apart articles. The overlapping portions of the film are then sealed along a continuous longitudinal seal. Next, the folded sheet of packaging material is fed to a sealing and cutting assembly, which seals the leading and trailing edges of the package to be formed about the enclosed article and cuts the tube into a plurality of individually sealed packages. In some instances, it may be desirable to apply heat during the process of sealing the overlapping portions of packaging material. Packages produced by this form, fill, and seal process are commonly used for snack bars, candy, cereals, and the like, as well as for other non-food articles.

The sealing of the overlapping end portions of the sheet of packaging material is frequently accomplished by a mechanical crimper assembly. A conventional mechanical crimper assembly includes a pair of opposed crimpers which are disposed on opposite sides of the overlapping portions of the sheet of packaging material. The crimpers are provided with respective undulating or serrated crimping surfaces defined by adjacent peaks and valleys. When the opposed crimpers are moved into engagement with the overlapping portions of the sheet of packaging material, the peaks of the first crimping surface are aligned with the valleys of the second crimping surface, and vice versa. Such engagement compresses the overlapping portions of the sheet of packaging material to form an intermeshing seal pattern. In some instances, the sheet of packaging material is provided with a cohesive coating for accomplishing the seal when compressed. In other instances, an intermediate seal layer of a coating or other bonding material is provided.

During the crimping and sealing process, it is important that the crimpers exert a sufficient amount of force to compress the overlapping portions of the sheet of packaging material. If an insufficient amount of force is exerted by the crimpers, then the overlapping portions of the sheet of packaging material will not be compressed sufficiently to form a complete seal. At the same time, however, it is equally important that the amount of force exerted by the crimpers not exceed the strength of the sheet of packaging material. If an excessive amount of force is exerted by the crimpers, the sheet of packaging material will tear or break. Thus, it is desirable that the amount of force which can be exerted by the crimpers against the overlapping portions of the sheet of packaging material remain within a predetermined range to insure a complete and secure seal.

In a conventional crimper assembly, the crimpers and the crimping surfaces have been formed from a strong, rigid material, such as high strength steel. Although such crimpers have functioned satisfactorily in the past, several drawbacks have been noted. First, in order to insure that the amount of force exerted by the crimpers against the overlapping portions of the sheet of packaging material remains within the predetermined desired range, the initial set-up of the crimpers on the crimping assembly must be performed very carefully. This time consuming operation must be repeated whenever it is desired to change from one film thickness to another and, therefore, is inefficient. Second, wrinkles which are occasionally present in the sheet of packaging material can cause additional overlapping portions to be compressed between the opposed crimpers. Because of the rigid nature of the crimpers, the presence of the wrinkles results in an excessive amount of force being applied to the overlapping portions of the sheet of packaging material. Third, in some packages, the number of overlapping layers of the sheet of packaging material varies from side to side. This can occur when the package being formed includes a longitudinally extending fin seal which is folded(d to one side. Each of the two end seals of the package would thus include a smaller thickness region (composed of only two overlapping portions of the sheet of packaging material) and a larger thickness region (composed of four overlapping portions of the sheet of packaging material). Similar varying thickness regions are found in packages containing conventional gusset folds and fin seals. It has been found to be quite difficult to set-up the two crimpers so as to exert a proper amount of force against these different thickness regions of the end seals. Although it is known to form the crimpers with bowed or recessed areas to accommodate the larger thickness region, such crimpers are more expensive and still suffer from the other drawbacks mentioned above. Thus, it would be desirable to provide an improved structure for a crimper assembly which addresses all of these drawbacks.

SUMMARY OF THE INVENTION

This invention relates to an improved structure for a crimper assembly for use in a form, fill, and seal apparatus for sealing overlapping portions of a sheet of packaging material after being folded about a plurality of articles. The crimper assembly includes upper and lower crimper bars which are supported for rotation about axes which extend generally perpendicular to the movement of the sheet of packaging material. A pair of upper crimpers are secured to opposite sides of the upper crimper bar, while a pair of lower crimpers are secured to opposite sides of the lower crimper bars. Each of the upper crimpers includes a metallic base having an outwardly facing portion with an undulating cross sectional shape. A slot is formed in the outwardly facing portion of the upper crimper, and a cutting blade is retained therein. In a first embodiment, an insert is secured to the base of each of the upper crimpers. The insert includes a rigid shank having a lip portion extending therefrom. Portions of the outer surface of the shank are covered by a layer of a relatively resilient material. The layer is formed from a material which is suitable for compressing overlapping portions of the folded sheet of packaging material to form an intermeshing seal pattern. The outwardly facing portion of the layer of resilient material includes a longitudinally extending, outwardly facing resilient crimping surface with an undulating cross sectional shape. The lower crimpers are formed in a similar manner, except that an anvil is retained within the slot. During operation, the crimpers are rotated such that the folded sheet of packaging material is compressed between the downwardly facing undulating surface of the upper resilient layer and the upwardly facing undulating surface of the lower base. As a result, the overlapping layers which make up the folded sheet of packaging material are sealed together to form a trailing edge seal for a packaged article. The cutting blade and anvil cooperate to cut the sealed packaging material into individual units.

Various objects and advantages of this invention will become apparent to those skilled in the art from the following detailed description of the preferred embodiments, when read in light of the accompanying drawings.

BRIEF DESCRIPTION OF THE DRAWINGS

FIG. 1 is a schematic perspective view of a form, fill, and seal apparatus for packaging articles including a rotary crimper assembly in accordance with this invention.

FIG. 2 is an enlarged sectional elevational view of a portion of the form, fill, and seal apparatus taken along line 2—2 of FIG. 1, showing the sheet of film partially wrapped about an article.

FIG. 3 is an enlarged sectional elevational view of a portion of the form, fill, and seal apparatus taken along line 3—3 of FIG. 1, showing the sheet of film fully wrapped about the article, but prior to being sealed and cut into individually sealed packages.

DETAILED DESCRIPTION OF THE PREFERRED EMBODIMENTS

Figure 4:
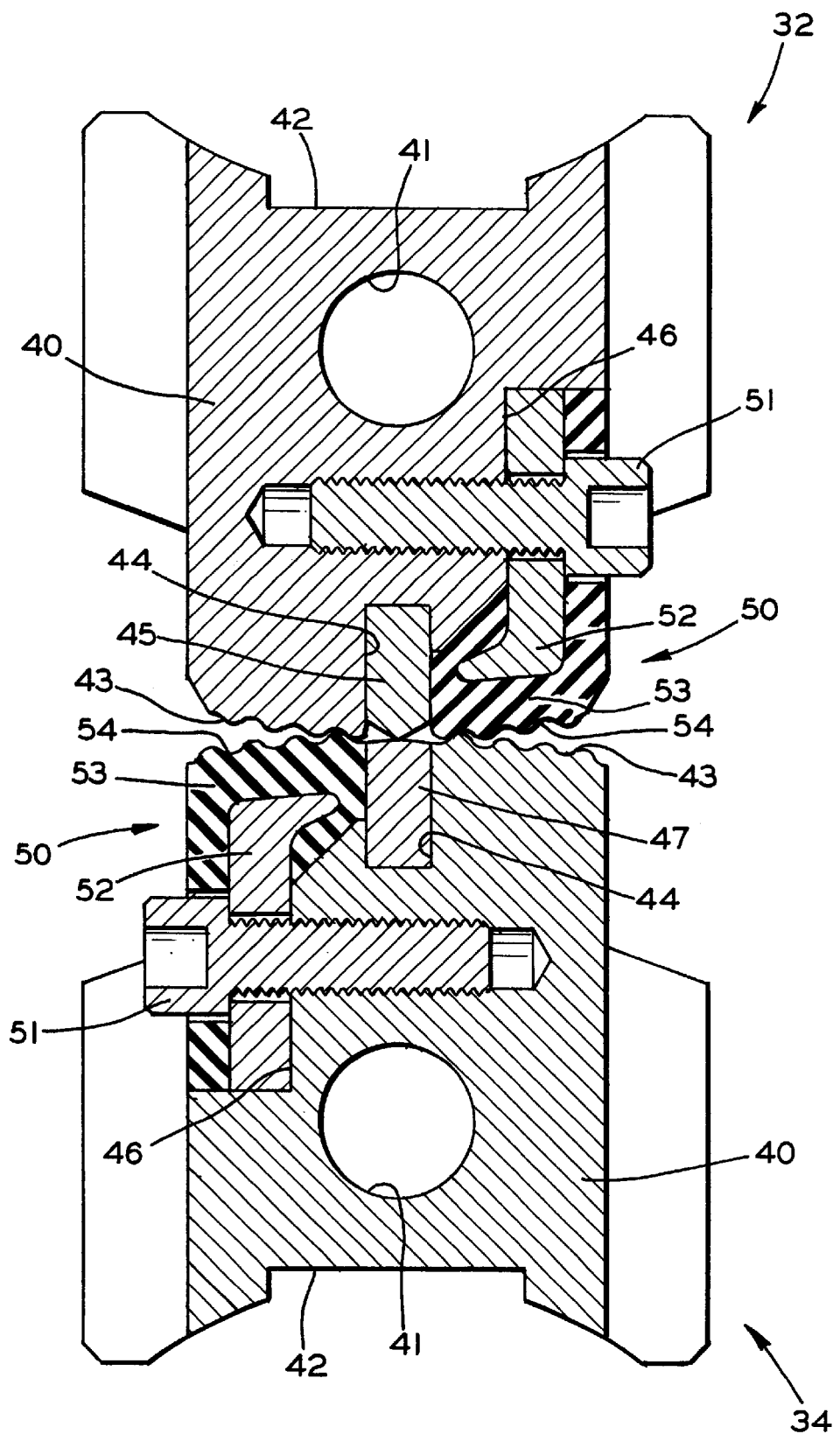
FIG. 4 is an enlarged sectional elevational view of the crimper assembly illustrated in FIG. 1 including a first embodiment of a pair of cooperating upper and lower crimpers.

Referring to the drawings, there is schematically illustrated in FIG. 1 a form, fill, and seal apparatus, indicated generally at 10, in accordance with this invention. The apparatus 10 is generally conventional in the art, and only those portions which are necessary for a complete understanding of this invention will be explained. The apparatus 10 includes means for supporting a roll 11 of a conventional packaging material, such as polypropylene films, saran films, or laminations of a plurality of films. A sheet 12 of the packaging material is payed out from a roll 11 and fed around various rollers 13 to a folding shoe 15. The folding shoe 15 is conventional in the art and is provided to continuously fold the longitudinal edges of the sheet 12 of packaging material about the sides of a plurality of articles 16 which are moved longitudinally along a conveyor 17. The folded sheet 12 of packaging material is then moved along a support surface 18.

As the folded longitudinal edges of the sheet 12 are moved along the support surface 18, they are engaged by a pair of folding rollers 20 disposed beneath the support surface 18. As a result, the longitudinal edges of the sheet 12 of packaging material are further folded downwardly in an overlapping manner, as shown in FIG. 2. Then, a pair of grooved heat seal rollers 21 disposed beneath the support surface 18 engage the overlapping edges of the sheet 12 of packaging material so as to create a continuous longitudinal fin seal 12a (see FIG. 3). The fin seal 12a is next engaged by a pair of pull rollers 22, also disposed beneath the support surface 18, which advance the folded sheet 12 of packaging material (and the articles 16 enclosed therein) through the apparatus 10. A deflector 18a is provided in the support surface 18 to fold the fin seal 12a upwardly into flush engagement with the folded sheet of packaging material, as shown in FIG. 3.

A rotary crimping assembly, indicated generally at 30, is provided in the apparatus 10 for laterally crimping and cutting the folded sheet 12 of packaging material so as to form a plurality of individually sealed packages, such as shown at 16a in FIG. 1. The crimping assembly 30 includes an upper crimper bar 31 which is disposed above the support surface 18 for rotation about an axis extending generally perpendicular to the longitudinal movement of the sheet 12 of packaging material. A pair of upper crimpers, indicated generally at 32, are secured to opposite sides of the upper crimper bar 31 for rotation therewith. The structure of one of the upper crimpers 32 will be explained in detail below. Similarly, the crimping assembly 30 includes a lower crimper bar 33 which is disposed below the support surface 18 for rotation about an axis extending generally perpendicular to the longitudinal movement of the sheet 12 of packaging material. A pair of lower crimpers, indicated generally at 34, are secured to opposite sides of the lower crimper bar 33 for rotation therewith.

Referring now to FIGS. 4 through 7, a first embodiment for the structures of the upper and lower crimpers 32 and 34, respectively, is illustrated in detail. As shown therein, the upper crimper 32 includes a metallic base 40 which extends along a portion of the upper crimper bar 31 and is secured thereto by threaded fasteners 31a (see FIG. 1) or any other conventional means. A longitudinally extending opening 41 is formed through the base 40 of the upper crimper 32. The opening 41 is provided to accommodate a conventional heating element (not shown) which can be disposed within the base 40 to raise the temperature thereof for heat sealing applications. The heating element is omitted from the opening 41 for cold sealing applications.

Figure 5:
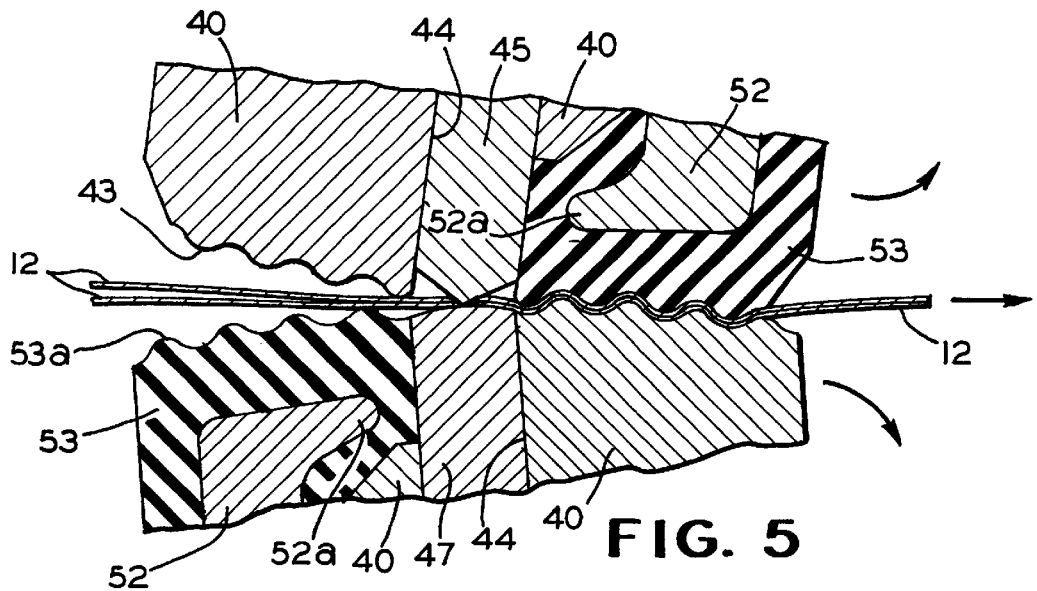
FIGS. 5, 6, and 7 are further enlarged sectional elevational view of a portion of the crimper assembly illustrated in FIG. 4 which sequentially illustrates the sealing process as the upper and lower crimpers are rotated and engage a folded sheet of the packaging material.
Figure 6:
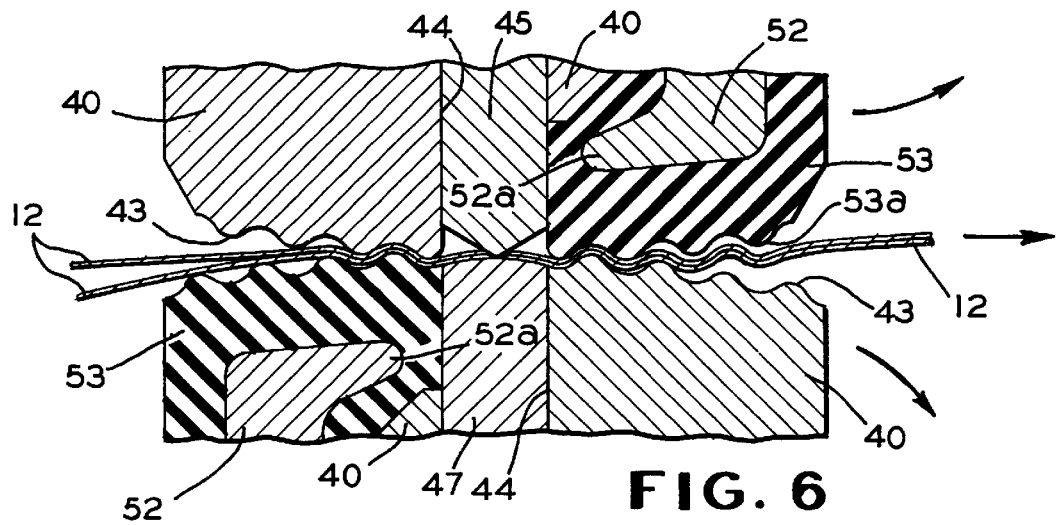
Figure 7:
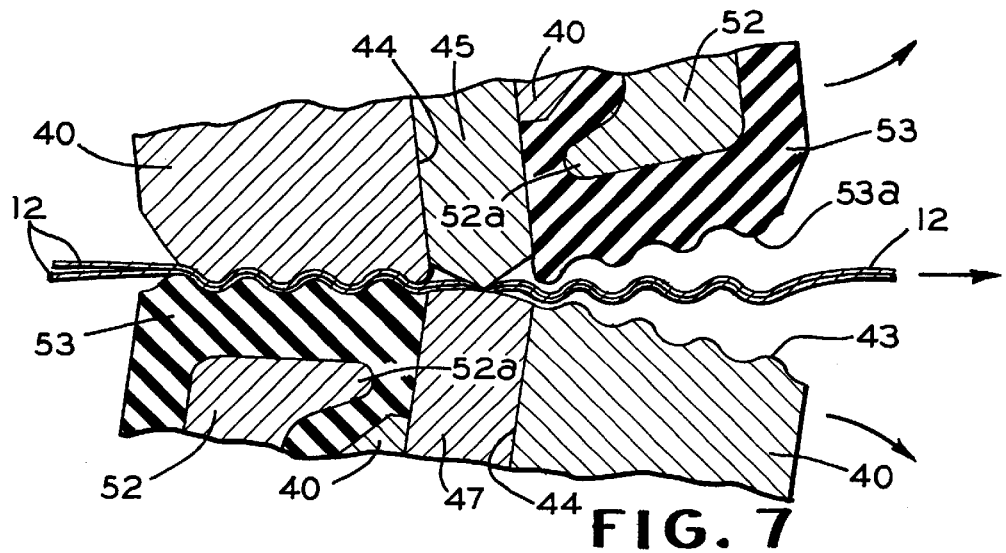

The inwardly facing portion of the base 40 is formed having a flat surface 42 which abuts a correspondingly shaped mounting surface (not shown) provided on the upper crimper bar 31 when secured thereto. The outwardly facing portion of the upper crimper 32 includes a longitudinally extending, outwardly facing rigid crimping surface 43. As best shown in FIGS. 5 through 7, the rigid crimping surface 43 is formed having an undulating cross sectional shape. The purpose for this undulating cross sectional shape will be explained below. The outwardly facing portion of the upper crimper 32 also includes a longitudinally extending slot 44. A conventional cutting blade 45 is disposed within the slot 44 and retained therein by threaded fasteners (not shown) or any other known retaining mechanism. The cutting blade 45 is formed having a sharp serrated edge which extends outwardly away from the upper crimper bar 31. The outwardly facing portion of the upper crimper 32 further includes a longitudinally extending recess 46.

An insert, indicated generally at 50, is disposed within the recess 46 and is secured to the base 40 of the upper crimper 32 by a plurality of threaded fasteners, one of which is illustrated at 51 in FIG. 4. However, it will be appreciated that the insert 50 may be secured to the base 40 by any other retaining means. The insert 50 includes a shank 52 having a lip portion 52a (see FIGS. 5 through 7) extending therefrom. The illustrated shank 52 extends longitudinally throughout the recess 46 formed in the base 40 of the upper crimper 32. The illustrated lip portion 52a extends generally perpendicular to the shank 52 so as to define a generally L-shaped cross sectional shape. The outer end of the lip portion 52a extends adjacent to the undulating rigid crimping surface 43 of the base 40. The shank 52 is preferably formed from a relatively strong and rigid material, such as steel.

Portions of the outer surface of the shank 52 are covered by a layer of a relatively resilient material. The layer 53 is formed from a material which is suitable for compressing overlapping portions of the folded sheet 12 of packaging material to form an intermeshing seal pattern, as will be described in detail below. The specific material used to form the layer 53 will vary from application to application. For cold sealing applications, the layer 53 may be formed from a resilient polyurethane material, such as ether or ester. For heat sealing applications, the layer 53 may be formed from a synthetic rubber material, such as EPDM or VITON a (fluoroelastomer based on a copolymer of vinylidene fluoride and hexafluoropropylene). Preferably, the layer 53 has a durometer hardness in the range of from about sixty to about one hundred ten, and preferably within the range of from about seventy-five to about ninety-five. The layer 53 may be molded about the desired portions of the shank 52 or applied thereto in any other known manner. Preferably, however, a portion of the layer 53 extends around the end of the L-shaped shank 52 as illustrated so as to prevent the layer 53 from separating from the shank 52 during use.

The outwardly facing portion of the layer 53 of resilient material includes a longitudinally extending, outwardly facing resilient crimping surface 53a. As best shown in FIGS. 5 through 7, the resilient crimping surface 53a may be formed having an undulating cross sectional shape. This undulating shape is preferable for use with the illustrated rotary crimping assembly 30. However, the crimping surface 53a may be formed having other shapes, such as flat, for other applications. The purpose for this undulating cross sectional shape will be explained further below.

The lower crimper 34 is formed in a similar manner as the upper crimper 32, and like reference numbers are used in the drawings to indicate identical structures. Thus, the lower crimper 34 includes a metallic base 40 having longitudinally extending opening 41, a flat surface 42, a longitudinally extending, outwardly facing rigid crimping surface 43, and a longitudinally extending slot 44. Rather than providing the cutting blade 45, a conventional anvil 47 is disposed within the slot 44 of the lower crimper and retained therein by threaded fasteners (not shown) or any other known retaining mechanism. The anvil 47 is formed having a slightly curved outer surface which extends outwardly away from the lower crimper bar 33. The outwardly facing portion of the lower crimper 34 further includes a longitudinally extending recess 46. An insert, indicated generally at 50, is disposed within the recess 46 and is secured to the base 40 of the lower crimper 34. The insert 50 includes a shank 52 having a lip portion 52a extending therefrom, and portions of the outer surface of the shank 52 are covered by a layer 53 of the relatively resilient material having an outwardly facing, resilient, and undulating crimping surface 53a.

Referring to FIGS. 5 through 7, the operation of the upper and lower crimpers 32 and 34 is illustrated in detail. As mentioned above, the upper and lower crimpers 32 and 34 are respectively secured to the upper and lower crimper bars 31 and 33 for rotation. As the folded sheet 12 of packaging material is moved along the support surface 18 in the direction of the central arrow, the upper and lower crimpers 32 and 34 are rotated as shown in FIGS. 5, 6, and 7 in the directions of the upper and lower arrows, respectively. As a result, the leading edges of the upper and lower crimpers 32 and 34 initially engage the folded sheet 12 of packaging material, as shown in FIG. 5. When this occurs, the folded sheet 12 of packaging material is compressed between the downwardly facing undulating surface 53a of the upper resilient layer 53 and the upwardly facing undulating surface 43 of the lower base 40. As a result, the overlapping layers which make up the folded sheet 12 of packaging material are sealed together to form a trailing edge seal for a packaged article 16.

Further movement of the folded sheet 12 of packaging material and rotation of the upper and lower crimpers 32 and 34, respectively, is illustrated in FIG. 6. As shown therein, the crimpers 32 and 34 have rotated to a position where the cutting blade 45 is aligned with the anvil 47. Consequently, the folded sheet 12 of packaging material is cut longitudinally into two pieces. Still further movement of the folded sheet 12 of packaging material and rotation of the upper and lower crimpers 32 and 34, respectively, is illustrated in FIG. 7. As shown therein, the trailing edges of the upper and lower crimpers 32 and 34 engage the folded sheet 12 of packaging material to compress the folded sheet 12 of packaging material between the downwardly facing undulating surface 43 of the upper base 40 and the upwardly facing undulating surface 53a of the lower resilient layer 53. As a result, the overlapping layers which make up the folded sheet 12 of packaging material are sealed together to form a leading edge seal for the next packaged article 16 on the conveyor 17.

Preferably, the upper and lower crimpers 32 and 34 are arranged such that the resilient layers 53 are within the range of from about 85% to about 95% of their uncompressed thicknesses when as shown in FIGS. 5, 6, and 7. The resiliency of the resilient layers 53 allows the crimping assembly 30 to accommodate wrinkles and variations in the thickness of the sheet 12 of packaging material, while insuring the formation of a secure seal. One of the other advantages of the invention is that the inserts 50 can be removed for inspection and replacement without requiring removal of the cutting blade 45 or the anvil 47.

Figure 8:
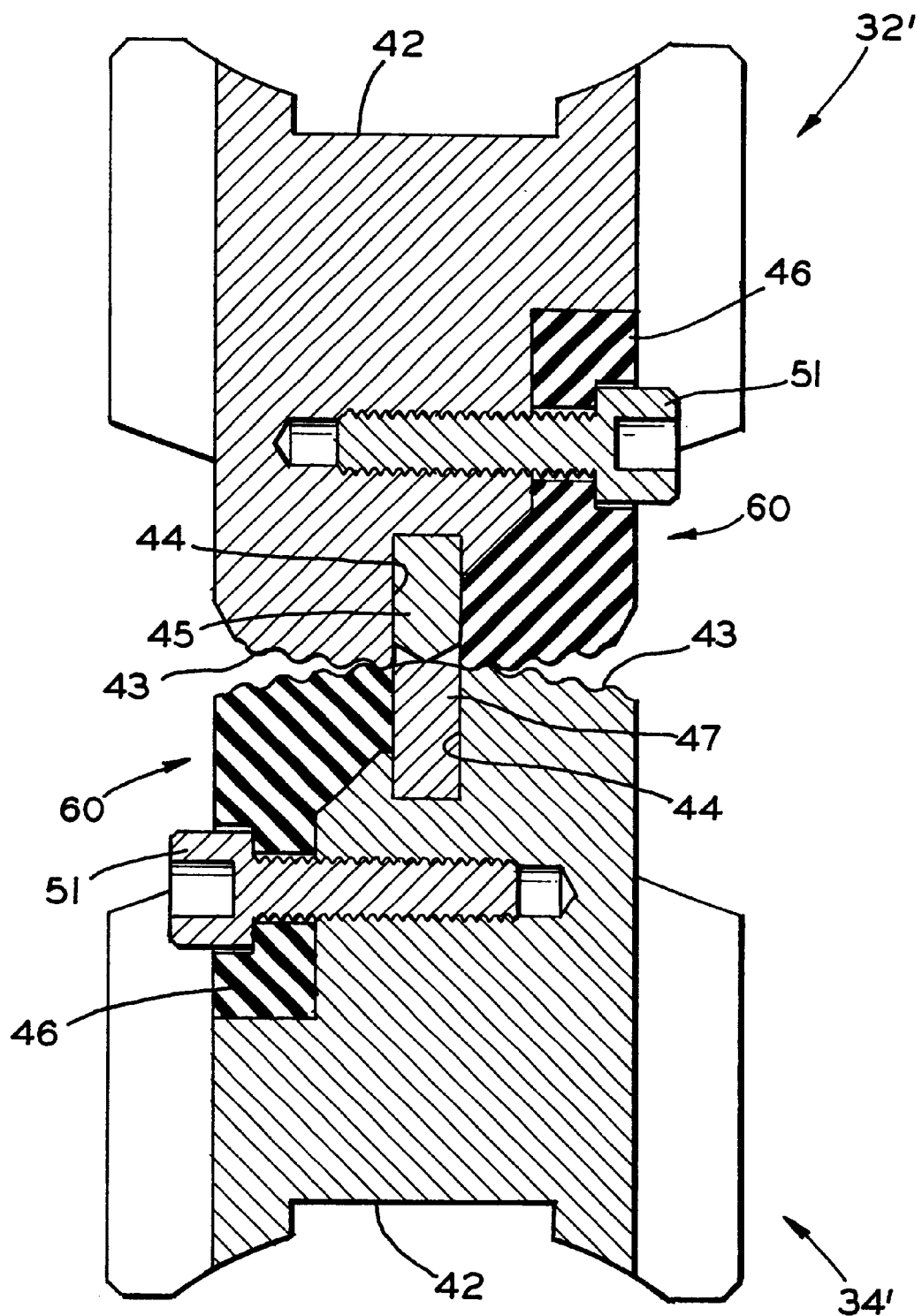
FIG. 8 is an enlarged sectional elevational view of the crimper assembly illustrated in FIG. 1 including a second embodiment of a pair of cooperating crimpers in accordance with this invention.

Referring now to FIG. 8, there is illustrated a second embodiment for the structures of the upper and lower crimpers 32' and 34'. As shown therein, the upper and lower crimpers 32' and 34' are formed having essentially the same structure as the upper and lower crimpers 32 and 34 discussed above, and like reference numbers are used to indicate identical structures. However, the inserts 50 of the above-described upper and lower crimpers 32 and 34 have been replaced by modified inserts, indicated generally at 60, in the alternative upper and lower crimpers 32' and 34'. As discussed above, the inserts 50 were composed of the shanks 52 having the respective layers 53 of resilient material molded thereto. The modified inserts 60 are formed solely of the resilient material, having no rigid shank contained therein. The crimpers 32' and 34' function in the same manner as described above. The openings 41 for the heating elements have been omitted from the modified crimpers 32' and 34' to indicate that such need not be provided in either of the embodiments.

Figure 9:
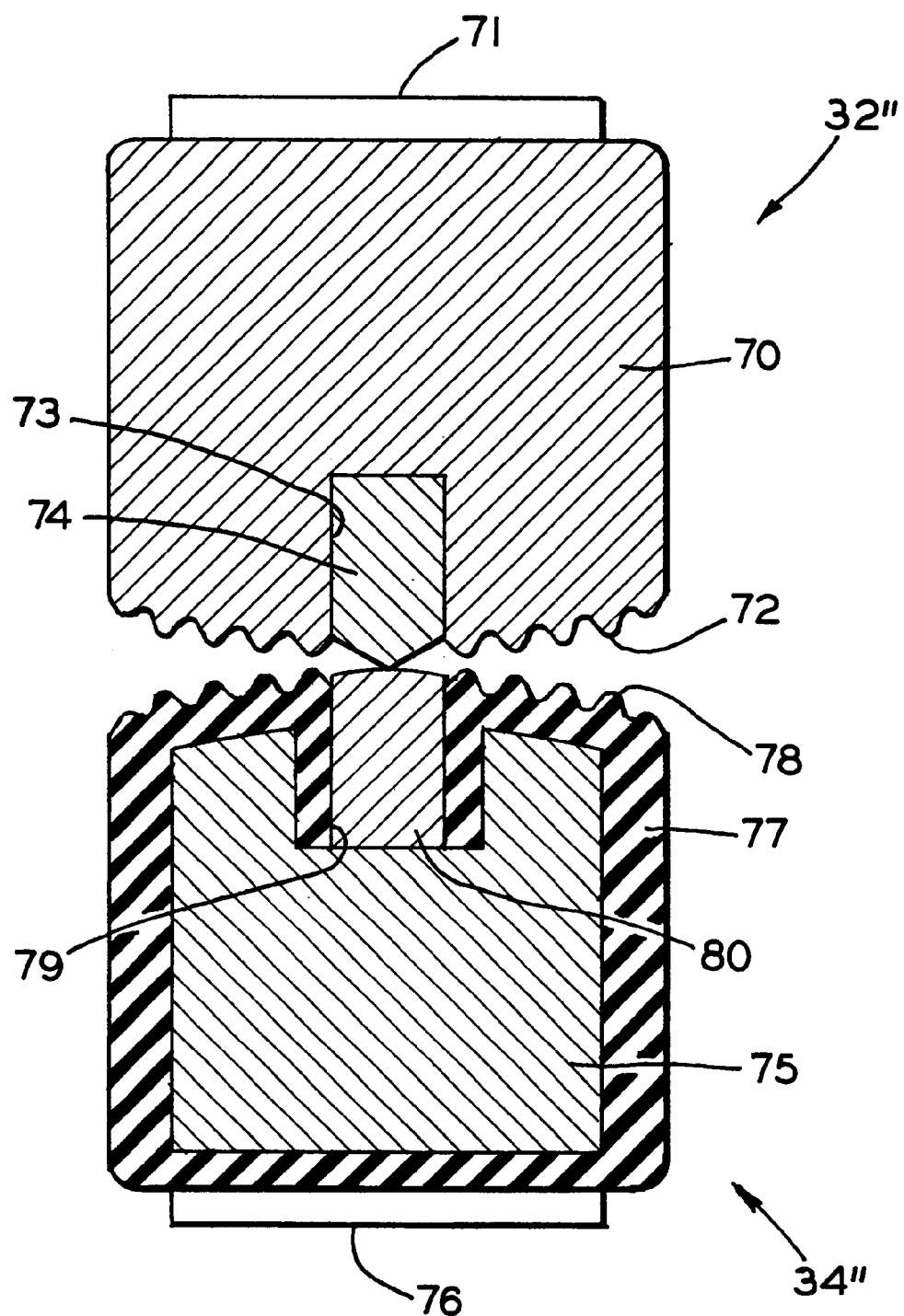
FIG. 9 is an enlarged sectional elevational view of the crimper assembly illustrated in FIG. 1 including a third embodiment of a pair of cooperating crimpers in accordance with this invention.

Referring now to FIG. 9, there is illustrated a third embodiment for the structures of the upper and lower crimpers 32" and 34". As shown therein, the upper crimper 32" includes a metallic base 70 which is adapted to extend along a portion of the upper crimper bar 31 and be secured thereto by threaded fasteners (not shown) or any other conventional means. The inwardly facing portion of the base 70 is formed having a flat surface 71 which abuts a correspondingly shaped mounting surface (not shown) provided on the upper crimper bar 31 when secured thereto. The outwardly facing portion of the base 70 includes a longitudinally extending, outwardly facing rigid crimping surface 72. As discussed above, the rigid crimping surface 72 can be formed having an undulating cross sectional shape. The outwardly facing portion of the base 70 also includes a longitudinally extending slot 73 having a conventional cutting blade 74 disposed therein.

The lower crimper 34" includes a metallic base 75 which is adapted to extend along a portion of the lower crimper bar 33 and be secured thereto by threaded fasteners (not shown) or any other conventional means. The inwardly facing portion of the base 75 is formed having a flat surface 76 which abuts a correspondingly shaped mounting surface (not shown) provided on the lower crimper bar 33 when secured thereto. The outwardly portions of the base 75 are covered by a layer 77 of a relatively resilient material. The outwardly facing portion of the layer 77 of resilient material includes a longitudinally extending, outwardly facing resilient crimping surface 78 having an undulating cross sectional shape. The outwardly facing portion of the base 75 also includes a longitudinally extending slot 79 having an anvil 80 disposed therein. The crimpers 32" and 34" function in the same manner as described above.

Figure 10:
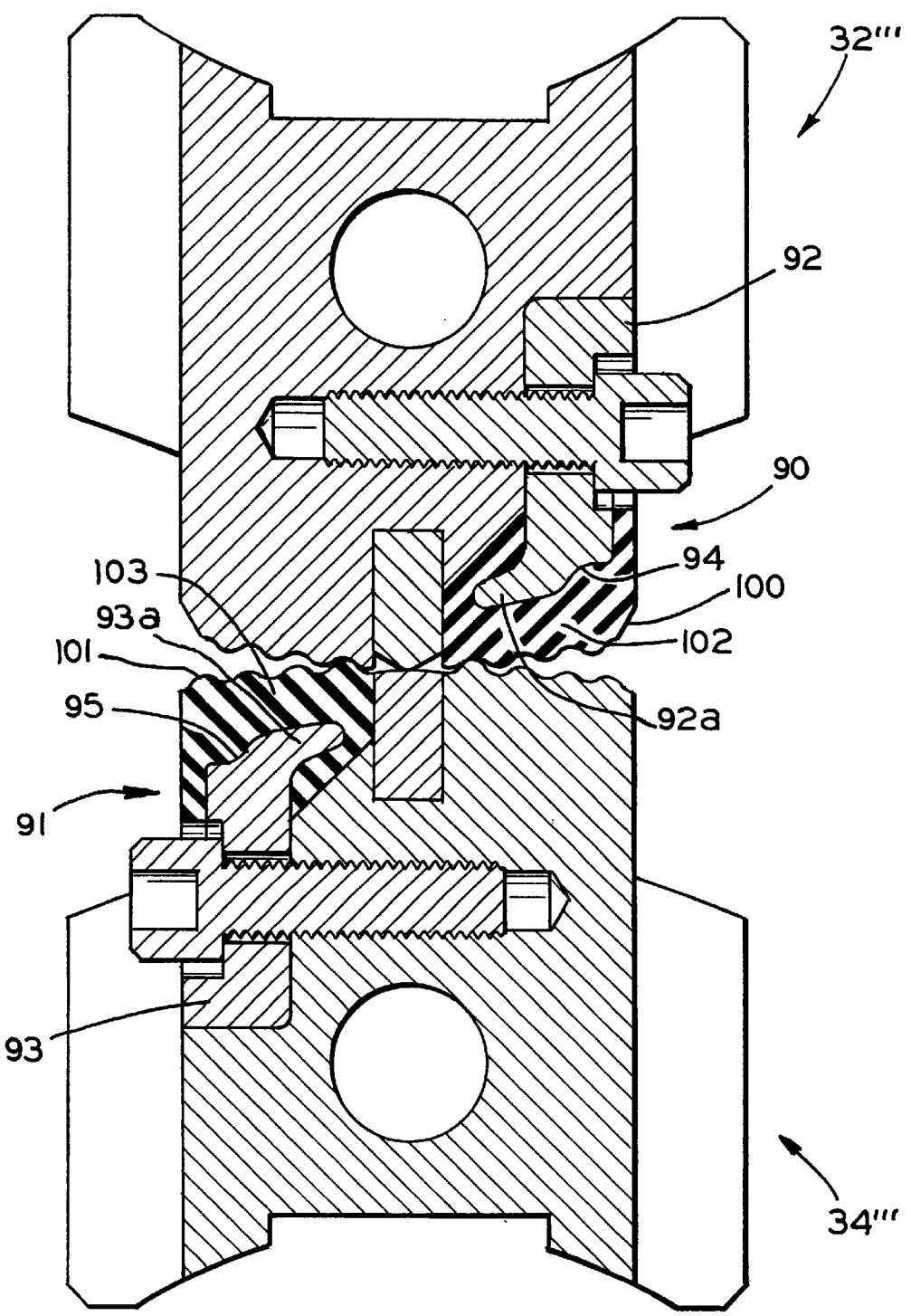
FIG. 10 is an enlarged sectional elevational view of the crimper assembly illustrated in FIG. 1 including a fourth embodiment of a pair of cooperating crimpers in accordance with this invention.

Referring now to FIG. 10, there is illustrated a fourth embodiment for the structures of the upper and lower crimpers, indicated generally at 32'" and 34'". As shown therein, the upper and lower crimpers 32'" and 34'" are formed having essentially the same structure as the upper and lower crimpers 32 and 34 discussed above. However, the upper and lower crimpers 32'" and 34'" include upper and lower inserts, indicated generally at 90 and 91, having respective modified upper and lower shanks 92 and 93. The upper and lower shanks 92 and 93 have respective lip portions 92a and 93a extending therefrom. A longitudinally extending notch or ledge 94 is formed in the lower edge of the upper shank 92. Similarly, a longitudinally extending notch or ledge 95 is formed in the upper edge of the lower shank 93. Each of the ledges 94 and 95 is preferably arcuate in cross section. A first portion of the ledge 94 of the upper shank 92 faces toward a leading edge 100 of the upper insert 90, while a second portion of the ledge 94 faces downwardly toward the lower insert 91. Similarly, a first portion of the ledge 95 of the lower shank 93 faces toward a trailing edge 101 of the lower insert 91, while a second portion of the ledge 95 faces upwardly toward the upper insert 90. The purpose for the ledges 94 and 95 will be described below. The upper and lower inserts 90 and 91 further include respective layers 102 and 103 of relatively resilient material. The layer 102 surrounds the lip portion 92a, the ledge 94, and the leading and trailing sides of the upper shank 92, while the layer 103 surrounds the lip portion 93a, the ledge 95, and the leading and trailing sides of the lower shank 93.

The ledges 94 and 95 provide additional mechanical support for the layers 102 and 103 of the relatively resilient material during the crimping process. Specifically, the ledge 95 of the lower shank 93 supports the layer 103 of the resilient material at the trailing edge of the lower insert 91 during the final stage of the crimping process, such as shown at FIG. 7 above. It has been found that the lower layer 103 of the relatively resilient material may, in some instances, be pulled away from the lower shank 93 as a result of the forces generated during the crimping process. This pulling away can result in undesirable delamination of the lower layer 103 from the lower shank 93. The mechanical support provided by the ledge 95 tends to prevent such delamination. The delamination problem appears to be more troublesome on the trailing edge of the lower insert 91. Thus, the ledge 94 illustrated on the upper shank 92 may be omitted if desired. Alternatively, a ledge may be provided on the trailing edge of the upper shank 92.

Figure 11:
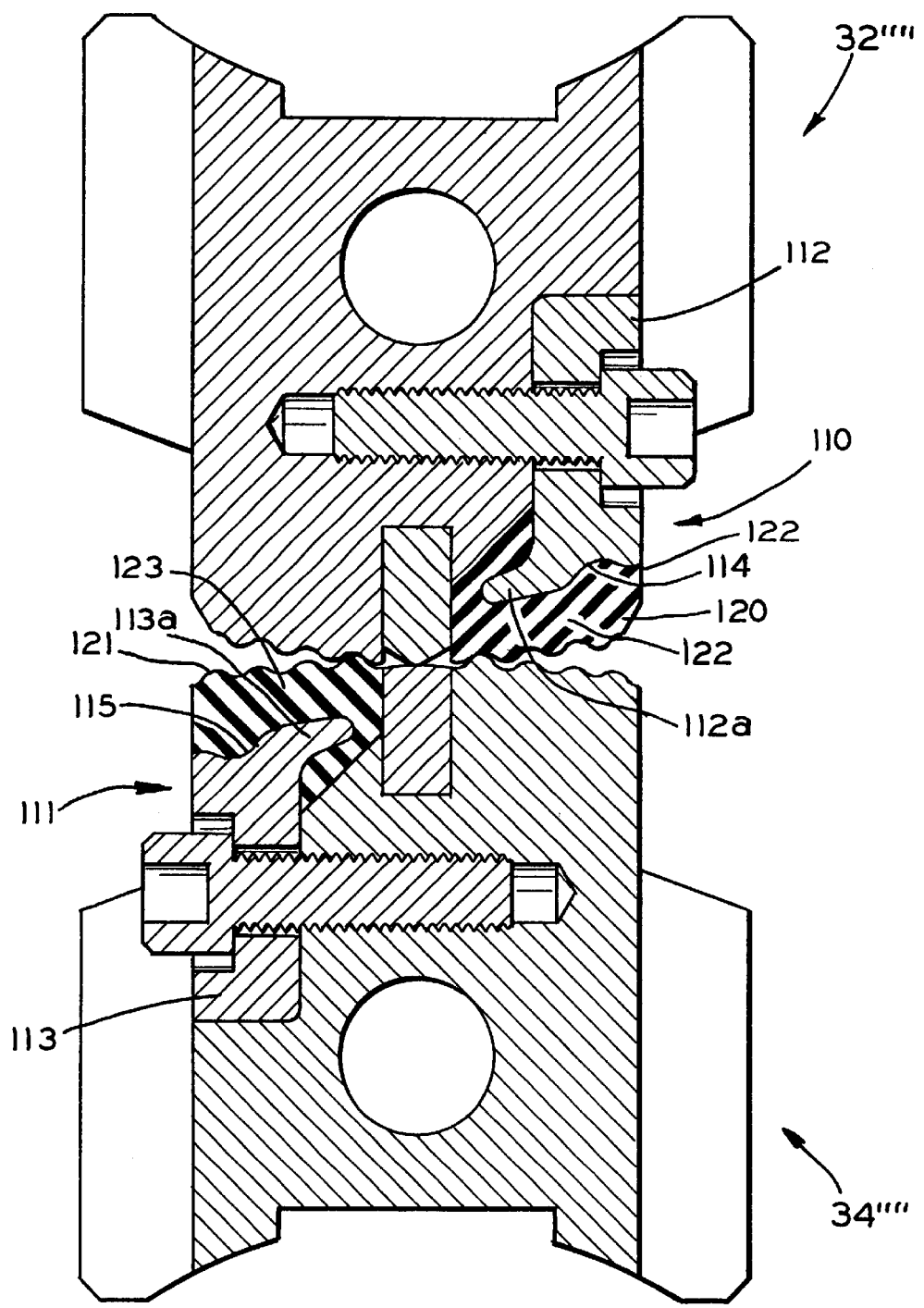
FIG. 11 is an enlarged sectional elevational view of the crimper assembly illustrated in FIG. 1 including a fifth embodiment of a pair of cooperating crimpers in accordance with this invention.

Referring now to FIG. 11, there is illustrated a fifth embodiment for the structures of the upper and lower crimpers, indicated generally at 32"" and 34"". As shown therein, the upper and lower crimpers 32"" and 34"" are formed having essentially the same structure as the upper and lower crimpers 32 and 34 discussed above. However, the upper and lower crimpers 32"" and 34"" include upper and lower inserts, indicated generally at 110 and 111, having respective modified upper and lower shanks 112 and 113. The upper and lower shanks 112 and 113 have respective lip portions 112a and 113a extending therefrom. A longitudinally extending notch or ledge 114 is formed in the lower edge of the upper shank 112. Similarly, a longitudinally extending notch or ledge 115 is formed in the upper edge of the lower shank 113. Each of the ledges 114 and 115 is preferably arcuate in cross section. A first portion of the ledge 114 of the upper shank 112 faces toward a leading edge 120 of the upper insert 110, while a second portion of the ledge 114 faces downwardly toward the lower insert 111. Similarly, a first portion of the ledge 115 of the lower shank 113 faces toward a trailing edge 121 of the lower insert 111, while a second portion of the ledge 115 faces upwardly toward the upper insert 110. The upper and lower inserts 110 and 111 further include respective layers 122 and 123 of relatively resilient material. The layer 122 surrounds the lip portion 112a, the ledge 114, and the trailing side of the upper shank 112, but does not extend over the leading side of the upper shank 112. The layer 123 surrounds the lip portion 113a, the ledge 115, and the leading side of the lower shank 113, but does not extend over the trailing side of the lower shank 113. The purpose for the ledges 114 and 115 is the same as described above in connection with FIG. 10.

It has been found to be desirable to form the shanks 52, 92 and 93, and 112 and 113 from an aluminum alloy material, such as 6061 T-6 aluminum alloy. It has been found that the layers of resilient material appear to bond more securely to such aluminum alloy material, thereby tending to prevent delamination as described above.

In accordance with the provisions of the patent statutes, the principle and mode of operation of this invention have been described in its preferred embodiments. However, it should be noted that this invention may be practiced otherwise than as specifically illustrated and described without departing from its scope. For example, the crimpers of this invention have been described and illustrated in the context of an otherwise conventional rotary crimping assembly. It will be appreciated, however, that the crimpers of this invention may be utilized in other types of conventional crimping assemblies, such as walking bar and intermittent crimping assemblies, wherein one or both of the crimpers are moved in such a manner as to engage and compress the packaging material therebetween.

What is claimed is:

1. A crimper assembly for sealing overlapping layers of a packaging material comprising:
   a first crimper including a rigid base having an insert removably secured thereto, said insert including a rigid shank having a layer of a resilient material provided thereon defining a first crimping surface;
   a second crimper having a second crimping surface formed thereon;
   means for moving at least one of said crimping surfaces of said first and second crimpers so as to engage and compress the overlapping layers of the packaging material therebetween.

2. The crimper assembly defined in claim 1 wherein said second crimper includes a rigid base having an insert removably secured thereto, said insert including a rigid shank having a layer of a resilient material provided thereon.

3. The crimper assembly defined in claim 2 wherein said rigid bases of said first and second crimpers are supported at predetermined positions relative to one another, and wherein said inserts can be removed from said rigid bases of said first and second crimpers without changing said predetermined relative positions.

4. The crimper assembly defined in claim 1 wherein said shank includes a body portion having a lip portion extending therefrom.

5. The crimper assembly defined in claim 4 wherein said lip portion extends generally perpendicular to said body portion so as to define a generally L-shaped cross sectional shape.

6. The crimper assembly defined in claim 4 wherein said layer of resilient material extends around said lip portion to prevent said layer of resilient material from separating therefrom.

7. The crimper assembly defined in claim 1 wherein said insert is secured to said rigid base by a threaded fastener.

8. The crimper assembly defined in claim 1 wherein said layer of resilient material is formed from a resilient polyurethane material.

9. The crimper assembly defined in claim 8 wherein said layer of resilient material is formed from one of ether or ester.

10. The crimper assembly defined in claim 1 wherein said layer of resilient material is formed from a synthetic rubber material.

11. The crimper assembly defined in claim 10 wherein said layer of resilient material is formed from one of EPDM or a fluoroelastomer based on a copolymer of vinylidene fluoride and hexafluoroporpylene.

12. The crimper assembly defined in claim 1 wherein said layer of resilient material is formed from a material having a durometer hardness in the range of from about sixty to about one hundred ten.

13. The crimper assembly defined in claim 12 wherein said layer of resilient material is formed from a material having a durometer hardness in the range of from about seventy-five to about ninety-five.

14. The crimper assembly defined in claim 1 wherein said shank has a ledge formed therein, and wherein said layer of resilient material is provided over said ledge.

15. The crimper assembly defined in claim 14 wherein said layer of resilient material surrounds said lip portion, said ledge, and both a leading side and a trailing side of said shank.

16. The crimper assembly defined in claim 14 wherein said layer of resilient material surrounds said lip portion, said ledge, and only a leading side of said shank.

17. The crimper assembly defined in claim 14 wherein said ledge is generally arcuate in cross sectional shape.

\* \* \* \* \*